(12) United States Patent
Kim (10) Patent No.: US 11,681,319 B1
(45) Date of Patent: Jun. 20, 2023

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/878,432

(22) Filed: Aug. 1, 2022

(30) Foreign Application Priority Data

Mar. 10, 2022 (KR) ................ 10-2022-0030153

(51) Int. Cl.
| | |
|---|---|
| *G05G 1/30* | (2008.04) |
| *G05G 1/40* | (2008.04) |
| *G05G 5/05* | (2006.01) |
| *G05G 1/44* | (2008.04) |
| *G05G 1/01* | (2008.04) |
| *B60T 7/06* | (2006.01) |
| *B60T 7/04* | (2006.01) |
| *G05G 1/38* | (2008.04) |
| *G05G 25/04* | (2006.01) |
| *B60K 26/02* | (2006.01) |

(Continued)

(52) U.S. Cl.
CPC ............ *G05G 1/40* (2013.01); *B60K 26/02* (2013.01); *B60R 21/09* (2013.01); *B60T 7/042* (2013.01); *B60T 7/06* (2013.01); *G05G 1/01* (2013.01); *G05G 1/38* (2013.01); *G05G 1/44* (2013.01); *G05G 5/005* (2013.01); *G05G 5/05* (2013.01); *G05G 25/04* (2013.01); *B60K 2026/026* (2013.01); *G05G 2505/00* (2013.01)

(58) Field of Classification Search
CPC .. G05G 1/01; G05G 1/30; G05G 1/32; G05G 1/34; G05G 1/36; G05G 1/38; G05G 1/40; G05G 1/405; G05G 1/42; G05G 1/44; G05G 1/445; G05G 5/005; G05G 5/03; G05G 5/05; G05G 5/28; G05G 25/04; G05G 2505/00; B60K 26/02; B60K 2026/024; B60K 2026/026; B60T 7/04; B60T 7/042; B60T 7/06; B60T 7/065; B60R 21/09; F16H 19/04
See application file for complete search history.

(56) References Cited

U.S. PATENT DOCUMENTS

| | | | |
|---|---|---|---|
| 10,906,514 B1 * | 2/2021 | Kim ................ | G05G 5/03 |
| 10,946,741 B1 * | 3/2021 | Kim ................ | B60T 7/06 |

(Continued)

FOREIGN PATENT DOCUMENTS

| | | | | |
|---|---|---|---|---|
| KR | 10-2021-0125733 A | | 10/2021 | |
| KR | 20210120154 A | * | 10/2021 | ............... G05G 1/30 |

OTHER PUBLICATIONS

Machine Translation of KR-20210120154-A.*

*Primary Examiner* — Richard W Ridley
*Assistant Examiner* — Brian J McGovern
(74) *Attorney, Agent, or Firm* — Fox Rothschild LLP (57) ABSTRACT

Provided is a foldable pedal apparatus for a vehicle that is configured such that a pedal pad protrudes toward a driver to be exposed (pop-up state) such that the pedal pad can be operated by the driver in a manual driving mode in which the driver manually drives, and the pedal pad is hidden not to be exposed to the driver (hidden state) such that the pedal pad cannot be operated by the driver in an autonomous driving situation.

17 Claims, 11 Drawing Sheets

(51) Int. Cl.
    *G05G 5/00* (2006.01)
    *B60R 21/09* (2006.01)

(56) References Cited

U.S. PATENT DOCUMENTS

| | | | |
|---|---|---|---|
| 11,021,058 B1* | 6/2021 | Kim | G05G 5/28 |
| 11,249,506 B1* | 2/2022 | Kim | G05G 5/28 |
| 11,312,236 B1* | 4/2022 | Kim | B60T 7/065 |
| 11,458,838 B1* | 10/2022 | Kim | B60T 7/06 |
| 11,465,498 B1* | 10/2022 | Kim | B60T 7/06 |
| 2022/0048384 A1* | 2/2022 | Kim | G05G 5/28 |

* cited by examiner

FOLDABLE PEDAL APPARATUS FOR VEHICLE

CROSS REFERENCE TO RELATED APPLICATION

The present application is based on and claims under 35 U.S.C. § 119(a) the benefit of Korean Patent Application No. 10-2022-0030153, filed Mar. 10, 2022, the entire contents of which is incorporated herein for all purposes by this reference.

TECHNICAL FIELD

Embodiments of the present disclosure relate to a foldable pedal apparatus for a vehicle and, more particularly, to a foldable pedal apparatus for a vehicle of which a pedal pad protrudes toward a driver to be exposed such that the driver can operate the pedal pad in a manual driving mode in which the driver manually drives and is hidden not to be exposed to the driver such that the driver cannot operate the pedal pad in an autonomous driving situation.

DESCRIPTION OF THE RELATED ART

An autonomous vehicle, which is a smart vehicle employing an autonomous technology going to a destination by itself even though a driver does not operate the steering wheel, accelerator pedal, brake, etc., is recently being rapidly developed.

If autonomous driving is generally used, a driver can select a manual driving mode in which the driver manually drives and an autonomous driving mode in which a vehicle goes by itself to a destination without the driver manually driving.

A driver should be able to take a rest in a comfortable position with his/her legs stretched in the autonomous driving mode. However, if pedals (the accelerator pedal and the brake pedal) disposed in the space under the driver seat keep exposed in the interior, they interfere with the driver taking a rest.

Further, the autonomous driving situation is a situation in which a driver does not operate the pedals (the accelerator pedal and the brake pedal) in the vehicle, but if the driver operates a pedal during autonomous driving, a vehicle control unit determines it is a situation in which the driver wants to stop autonomous driving and manually drive, thereby stopping control for autonomous driving.

However, since the pedals are installed to be exposed in the space under the driver seat in a vehicle, there is a possibility that a driver unconsciously operates the pedals in the autonomous driving situation (misoperation of a pedal), and in this case, there is a possibility of an accident, depending on the road situation, the inter-vehicle distance, or the like.

Therefore, it is required to develop a pedal apparatus that exposes a pedal pad toward a driver such that the driver can operate the pedal pad in the manual driving mode in which the driver manually drives, and that hides the pedal pad such that the driver cannot operate the pedal pad for a comfortable rest and safety such as prevention of misoperation in the autonomous driving situation.

SUMMARY

An objective of the present disclosure is to provide a foldable pedal apparatus for a vehicle in which a pedal pad protrudes toward a driver to be exposed (pop-up state) such that the pedal pad can be operated by the driver in a manual driving mode in which the driver manually drives, and the pedal pad is hidden not to be exposed to the driver (hidden state) such that the pedal pad cannot be operated by the driver in an autonomous driving situation, thereby enabling the driver to comfortably take a rest in the autonomous driving situation and improving safety by preventing misoperation of the pedals in the autonomous driving situation.

Another objective of the present disclosure is to provide a foldable pedal apparatus that can maximally secure a Power Electronic (PE) room space and an interior space and can contribute to reducing the manufacturing cost and the weight by making the mechanism of a foldable pedal as slim and compact as possible.

In order to achieve the objectives, a foldable pedal apparatus for a vehicle according to an exemplary embodiment of the present disclosure includes: a slider configured to be move straightly with respect to a footrest panel by power of an actuator; a pedal pad installed to be rotatable with respect to the footrest panel and configured to be operated by a driver; and a return spring configured to provide elasticity to the pedal pad such that the pedal pad protrudes into an interior in which a driver is positioned, in which when the pedal pad is rotated forward and positioned in a PE room space by movement of the slider, the pedal pad enters a hidden state in which the pedal pad cannot be operated by a driver in an autonomous driving state, and when the pedal pad is rotated rearward and protrudes into an interior by movement of the slider and elasticity of the return spring, the pedal pad enters a pop-up state in which the pedal pad can be operated by a driver in a manual driving mode.

Two pedal assemblies that are the same in configuration and each include the actuator, the slider, the pedal pad, and the return spring may be provided and spaced left and right apart from each other on the footrest panel.

Any one of the two pedal assemblies spaced left and right apart from each other on the footrest panel may be used as an accelerator pedal apparatus and the other one may be used as a brake pedal apparatus.

The foldable pedal apparatus may further include a pedal housing that is fixed at a front side of the footrest panel and to which a lower end of the pedal housing is rotatably coupled through a hinge pin, in which the pedal pad may be rotated forward on the hinge pin and inserted into the pedal housing in an autonomous driving situation, and the pedal pad may be rotated rearward on the hinge pin and may protrude into the interior through a panel hole of the footrest panel in a manual driving mode.

When the pedal pad is rotated forward on the hinge pin and inserted into the pedal housing, a pad surface of the pedal pad may be leveled with the footrest panel, so a driver may not operate the pedal pad.

A panel hole through which the pedal pad is disposed may be formed at the footrest panel; and a guide configured to guide movement of the slider may be coupled to the footrest panel over the panel hole.

The actuator may be a rotary motor fixed to the footrest panel and being able to rotate both clockwise and counterclockwise; and a pinion may be coupled to the rotary motor and a rack gear may be coupled to the slider, so power of the rotary motor may be transmitted to the slider through the pinion and the rack gear.

The pedal pad has: a pad surface configured to be operated by a driver's foot; and a top surface connected with the pad surface with an obtuse angle.

The slider may be positioned over the pedal pad; and when the pedal pad is in a hidden state, in a pop-up state, is changed into the pop-up state from the hidden state, or is changed into the hidden state from the pop-up state, the top surface of the pedal pad and a lower end of the slider may be in contact with each other.

The slider may be positioned over the pedal pad; and when the pedal pad is in the pop-up state and a driver does not operate the pedal pad, the top surface of the pedal pad and lower end of the slider are in contact with each other, and when a driver operates the popped-up pedal pad and the pedal pad is rotated forward, the top surface of the pedal pad and the lower end of the slider may be separated.

The lower end of the slider may be an inclined surface fitting the top surface of the pedal pad.

The slider and the top surface of the pedal pad may come in contact with each other with an acute angle.

The foldable pedal apparatus may further include: a permanent magnet coupled to the pedal pad to face the pedal housing; and a PCB coupled to the pedal housing to face the permanent magnet, in which the PCB may recognize a variation of magnetic flux of the permanent magnet and may generate a signal related to a pedal function when the pedal pad is rotated.

When the slider is moved by operation of the actuator and a position of the permanent magnet is changed while the pedal pad is rotated into the hidden state or the pop-up state, the PCB may not generate a signal related to the pedal function to prevent misoperation.

The PCB may generate a signal related to the pedal function only when the pedal pad is moved forward by a driver and the position of the permanent magnet is changed without the actuator operating in the pop-up state in which the slider has been moved by operation of the actuator and the pedal pad has been rotated by elasticity of the return spring to be exposed toward the driver.

The foldable pedal apparatus may further include a cover member made of an elastic material and connecting the footrest panel and the pedal pad to each other, in which the cover member may be extended and contracted when the pedal pad is rotated, thereby preventing foreign substances from entering a gap between the slider and the pedal pad.

The foldable pedal apparatus for a vehicle according to the present disclosure is configured such that a pedal pad protrudes toward a driver to be exposed (pop-up state) such that the pedal pad can be operated by the driver in a manual driving mode in which the driver manually drives, and the pedal pad is hidden not to be exposed to the driver (hidden state) such that the pedal pad cannot be operated by the driver in an autonomous driving situation, whereby there is an effect of enabling the driver to comfortably take a rest in the autonomous driving situation and improving safety by preventing misoperation of the pedals in the autonomous driving situation.

Further, there is an effect that the foldable pedal apparatus can maximally secure a PE room space and an interior space and can contribute to reducing the manufacturing cost and the weight by making the mechanism of a foldable pedal as slim and compact as possible.

As discussed, the system suitably includes use of a controller or processor.

In another embodiment, vehicles are provided that comprise an apparatus as disclosed herein.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all modifications, equivalents, and substitutions are included in the scope and spirit of the present disclosure.

It will be understood that, although the terms first, second, etc. may be used herein to describe various elements, these elements should not be limited by these terms. These terms are only used to distinguish one element, from another element. For instance, a first element discussed below could be termed a second element without departing from the right range of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

Terms used in the present disclosure are used only in order to describe specific exemplary embodiments rather than limiting the present disclosure. Singular forms are intended to include plural forms unless the context clearly indicates otherwise. It will be further understood that the terms "comprises" or "have" used in this specification specify the presence of stated features, numerals, steps, operations, components, parts, or a combination thereof, but do not preclude the presence or addition of one or more other features, numerals, steps, operations, components, parts, or a combination thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control unit (controller) according to exemplary embodiments of the present disclosure can be implemented through a nonvolatile memory (not shown) configured to store algorithms for controlling operation of various components of a vehicle or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

A foldable pedal apparatus for a vehicle according to an exemplary embodiment of the present disclosure is described hereafter in detail with reference to the accompanying drawings.

A foldable pedal apparatus for a vehicle according to embodiments of the present disclosure, as shown in FIGS. 1 to 11, includes: a slider 200 that is moved straightly with respect to a footrest panel 10 by power of an actuator 100; a pedal pad 300 installed to be rotatable with respect to the footrest panel 10 and configured to be operated by a driver; and a return spring 400 providing elasticity to the pedal pad 300 so that the pedal pad 300 protrude to an interior in which a driver is positioned.

Figure 2:
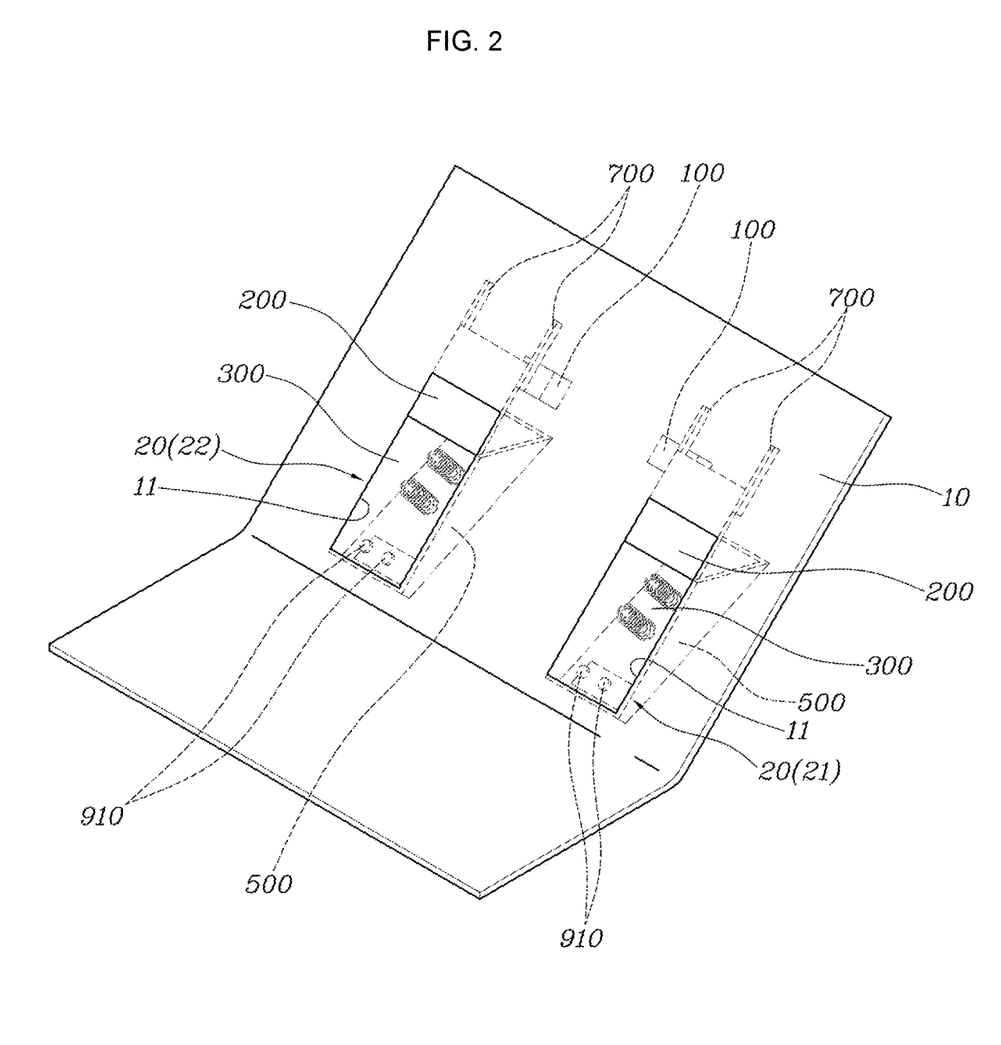
FIG. 2 is an assembly view of FIG. 1 in which pedal pads have been hidden.
Figure 3:
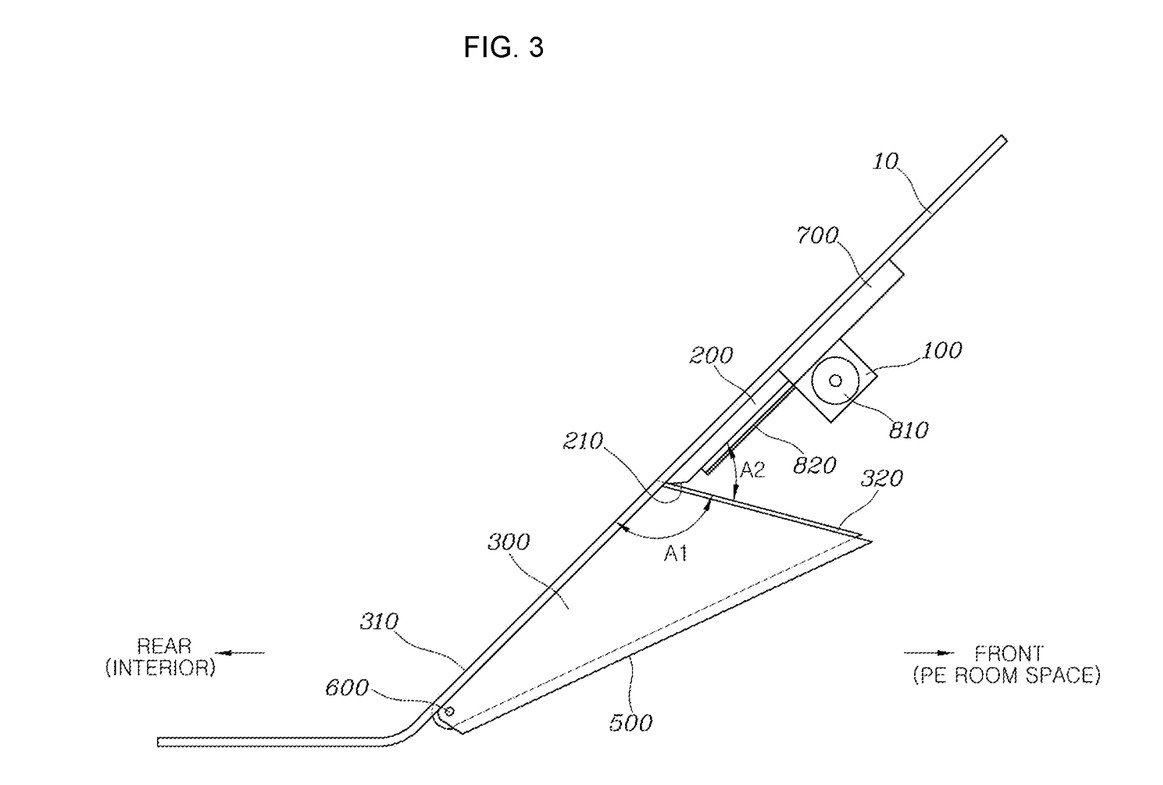
FIGS. 3 and 4 are a side view and a front view of FIG. 2.
Figure 4:
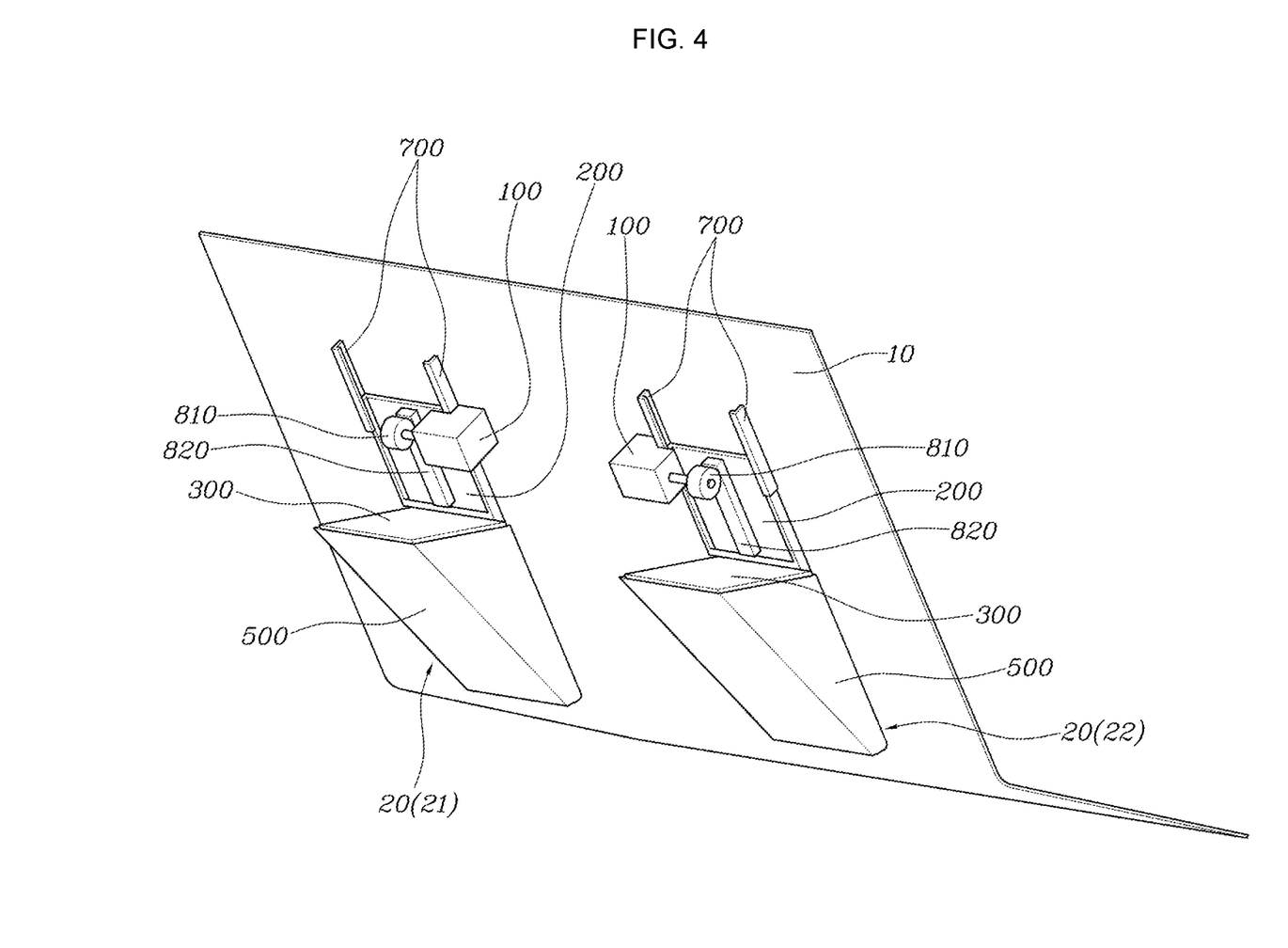

In an autonomous driving situation, the slider 200 is moved by operation of the actuator 100 and the pedal pad 300 is rotated forward to be position in the PE room space, and accordingly, the pedal pad 300 enters a hidden state in which a driver cannot operate the pedal pad 300 (see FIGS. 2 to 4).

Figure 8:
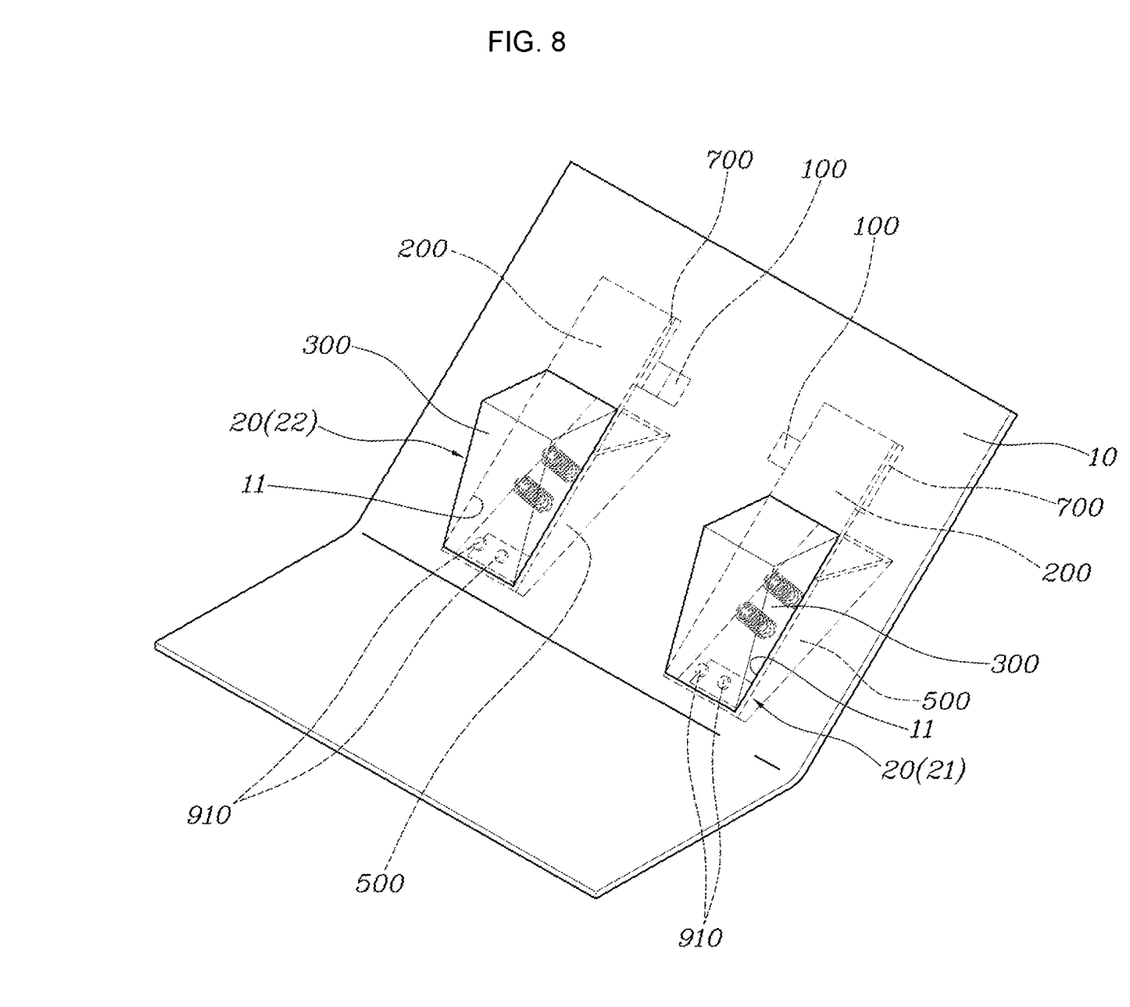
FIG. 8 is a view showing the state in which pedal pads have popped up in FIG. 2.
Figure 9:
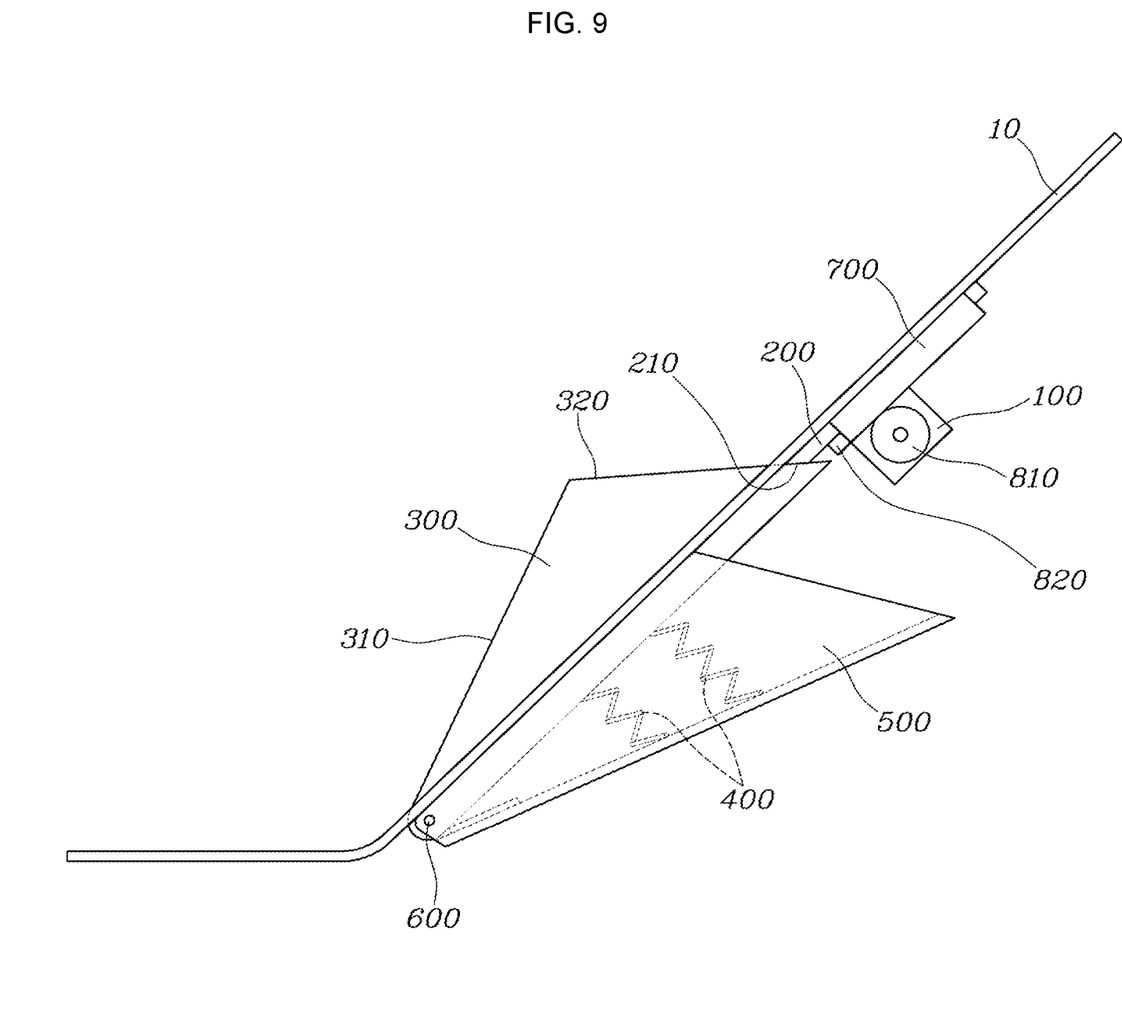
FIG. 9 is a side view of FIG. 8.

In a manual driving mode, the slider 200 is moved by operation of the actuator 100 and the pedal pad 300 is rotated rearward to protrude into an interior by the elasticity of the return spring 400, and accordingly, the pedal pad 300 enters a pop-up state in which a driver cannot operate the pedal pad 300 (see FIGS. 8 to 9).

In an electric vehicle, the front side of the footrest panel 10 is a PE room space in which PE parts are positioned, and the rear side of the footrest panel 10 is an interior in which a driver is positioned.

According to the foldable pedal apparatus of embodiments of the present disclosure, when the pedal pad 300 is rotated forward and positioned in the PE room space by operation of the actuator 100, the hidden state in which the driver cannot operate the pedal pad is maintained.

When the pedal pad 300 enters the hidden state, the pedal pad 300 is positioned in the PE room space, so the pedal pad 300 is not exposed to the visual field of a driver or passengers, whereby there is an advantage that the interior design of a vehicle can be maximally improved.

Further, according to embodiments of the present disclosure, the space for hiding the pedal pad 300 in the hidden state can be minimized, so there is an advantage that it is possible to maximally secure the interior and the PE room space of a vehicle.

Further, according to the foldable pedal apparatus of embodiments of the present disclosure, when the pedal pad 300 is rotated rearward and protrude into the interior of a vehicle by operation of the actuator 100, the pedal pad 300 enter the pop-up state in which the pedal pad 300 is exposed to a driver and the driver can operate the pedal pad 300.

When the pedal pad 300 in the hidden state enters the pop-up state, the pedal pad 300 is exposed to the interior in which a driver is positioned through a panel hole 11 of the footrest panel 10.

Accordingly, when popping up, the pedal pad 300 hidden in the PE room space with respect to the footrest panel 10 protrudes through the panel hole 11 of the footrest panel 10, so there is an advantage that the high-tech image can be maximized.

Figure 1:
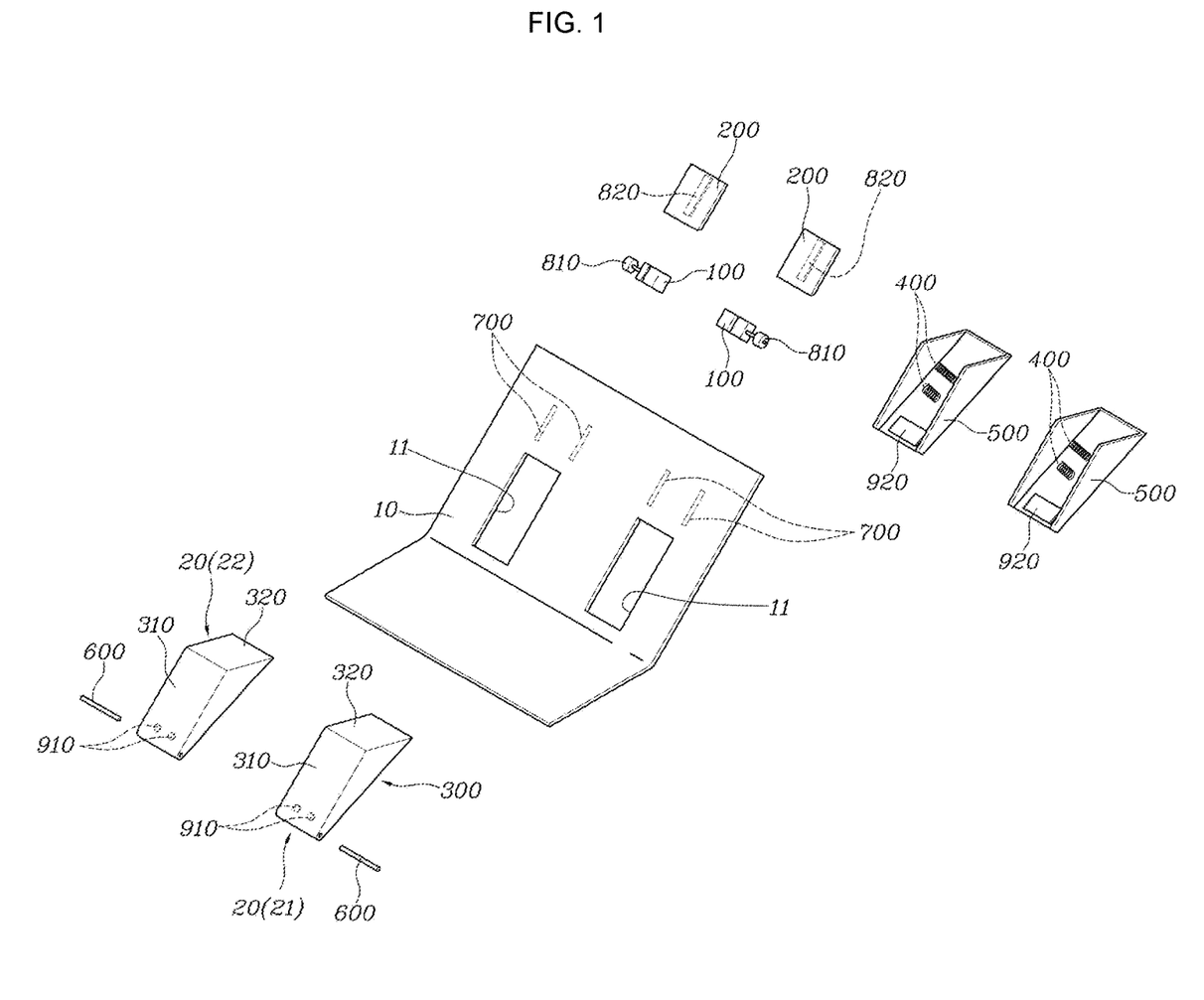
FIG. 1 is an exploded view of a foldable pedal apparatus according to an exemplary embodiment of the present disclosure.

A pedal assembly 20 of the foldable pedal apparatus according to embodiments of the present disclosure includes the actuator 100, the slider 200, the pedal pad 300, and the return spring 400, and two pedal assemblies 200 that are the same in general configuration are provided. The two pedal assemblies 200 are spaced left and right apart from each other on the footrest panel 10. Any one of the two pedal assemblies 200 spaced left and right apart from each other on the footrest panel 10 is used as the pedal assembly for an accelerator pedal apparatus 21 and the other one is used as the pedal assembly for a brake pedal apparatus 22.

The pedal assembly 20 according to embodiments of the present disclosure includes a pedal housing, a permanent magnet, a PCB, etc., which will be described below, other than the actuator 100, the slider 200, the pedal pad 300, and the return spring 400.

Figure 7:
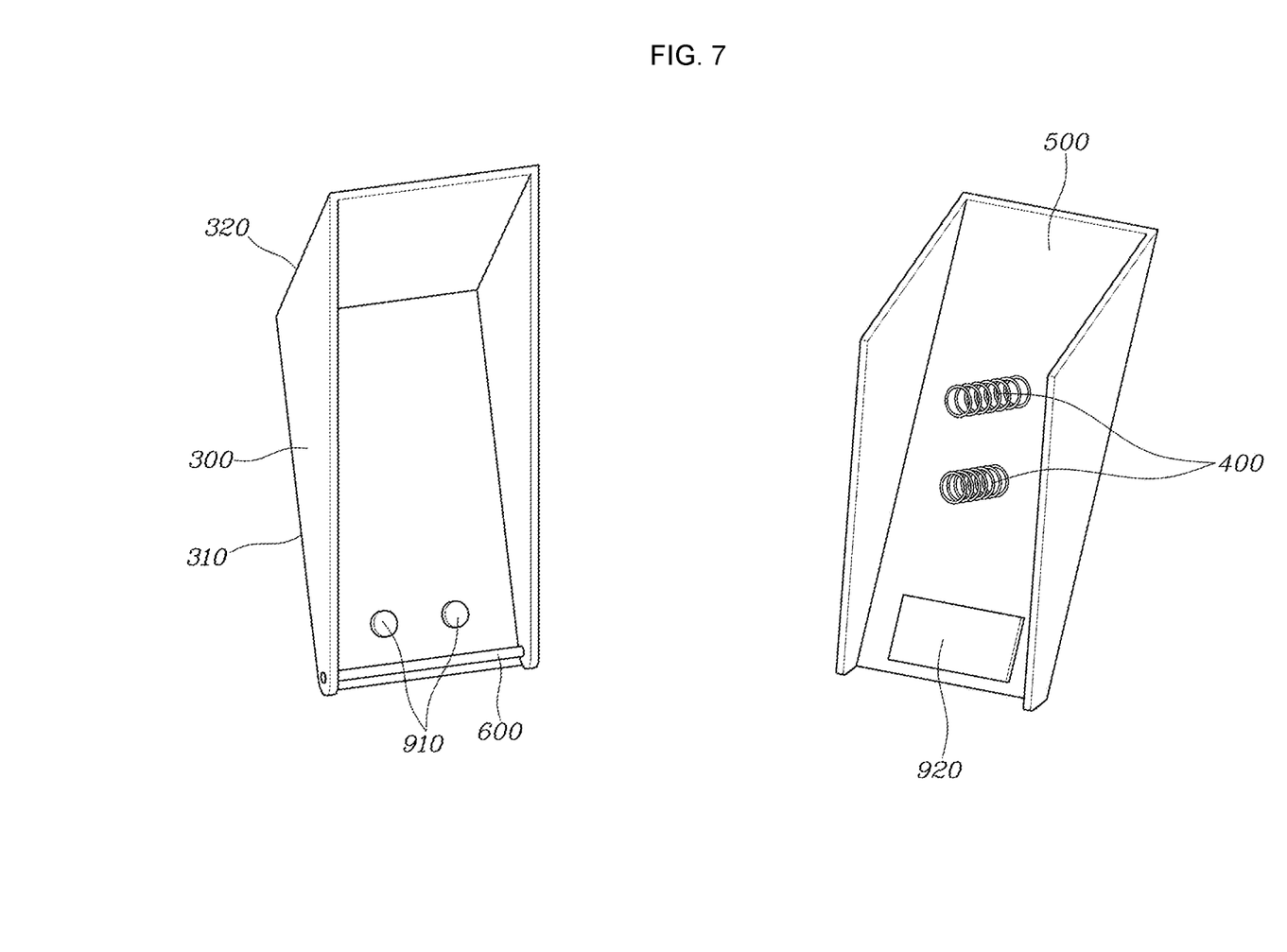
FIG. 7 is an exploded view of a pedal pad and a pedal housing according to an exemplary embodiment of the present disclosure.

The pedal housing 500 is fixed in the PE room space at the front side of the footrest panel 10 and the lower end of the pedal pad 300 is coupled to the pedal housing 500 to be rotatably through a hinge pin 600.

The pedal pad 300 is rotated forward on the hinge pin 600 and inserted and positioned in the pedal housing 500 in an autonomous driving situation, and the pedal pad 300 is rotated rearward on the hinge pin 600 and protrudes into the interior through the panel hole 11 of the footrest panel 10.

The pedal housing 500 is formed to have a U-shaped cross-section to have a space in which the pedal pad 300 can be inserted and is installed such that an opening thereof faces the panel hole 11 of the footrest panel 10.

When the pedal pad 300 enters the hidden state by rotating forward on the hinge pin 600 and being inserted into the pedal housings 500, a pad surface 310 of the pedal pad 300 is leveled with the footrest panel 10, so a driver cannot operate the pedal pad 300 in this state.

The return spring 400 is disposed such that one end is supported by the pedal pad 300 and another end is supported by the pedal housing 500, thereby providing elasticity to the pedal pad 300 so that the pedal pad 300 protrudes into the interior in which a driver is.

The return spring 400 is a part disposed inside the assembly of the pedal pad 300 and the pedal housing 500, so an efficient layout structure can be achieved. Accordingly, it is possible to reduce the size of the assembly of the pedal pad 300 and the pedal housing 500 and the external size of the entire pedal apparatus.

It is possible to tune a pedal effort by tuning the spring force of the return spring 400, and particularly, the return spring 400 may be a dual spring having different spring forces to be able to suppress fine vibration of the pedal pad 300, and a compression coil spring may be used.

The panel hole 11 formed at the footrest panel 10 is elongated up and down, the pedal pad 300 is disposed through the panel hole 11, and a guide 700 that guides movement of the slider 200 is fixed to the footrest panel 10 over the panel hole 11.

Figure 5:
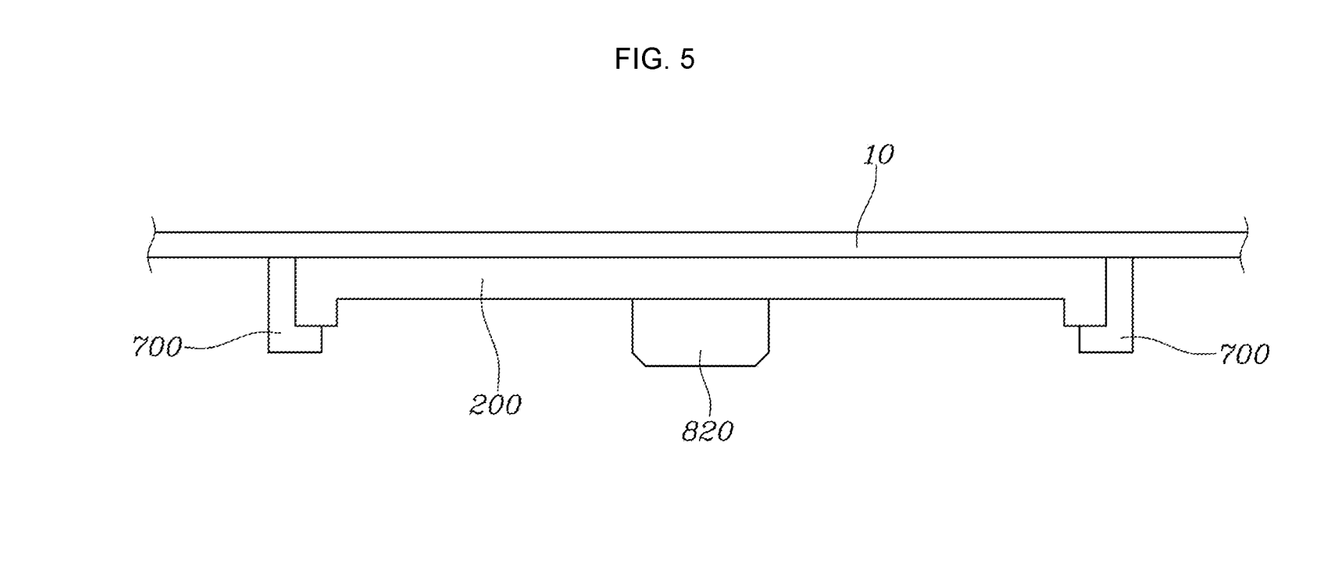
FIG. 5 is a view illustrating a coupling structure of a slider and a guider according to the present disclosure.

Two guides 700 are spaced left and right apart from each other over one panel hole 11, both left and right sides of the slider 200 are fixed to the two guides 700, whereby the guides 700 guide up-down straight movement of the slider 200.

According to embodiments of the present disclosure, the slider 200 is moved by power of the actuator 100 and the actuator 100 may be a rotary motor that can rotate both clockwise and counterclockwise.

The operation of the rotary motor may be controlled by a PCB to be described below.

The rotary motor is fixed to the front surface of the footrest panel 10, a pinion 810 is coupled to a motor shaft, and a rack gear 820 is coupled to the slider 200, to the power of the rotary motor is transmitted to the slider 200 through the pinion 810 and the rack gear 820.

Since the guides 700 are positioned over the panel hole 11, the slider 200 is positioned over the pedal pad 300.

The pedal pad 300 has a pad surface 310 that a driver operates with a foot, and a top surface 320 connected with the pad surface 310 at an angle, and the pad surface 310 and the top surface 320 are connected with an obtuse angle A1.

Since the angle made by the pad surface 310 and the top surface 320 of the pedal pad is an obtuse angle A1 larger than 90° and smaller than 180°, when the slider 200 moves down and the lower end of the slider 200 presses the top surface 320 of the pedal pad 300, the pedal pad 300 is smoothly rotated forward on the hinge pin 600, whereby the pedal pad 300 is smoothly hidden.

Further, when the slider 200 moves up, the top surface 320 of the pedal pad 300 is released, so the pedal pad 300 is smoothly rotated rearward on the hinge pin 600 by the spring force of the return spring 400, whereby the pedal pad 300 is smoothly popped up.

The slider 200 is positioned over the pedal pad 300.

When the pedal pad 300 is in the hidden state in which the pedal pad 300 has been rotated forward, is in the pop-up state in which the pedal pad 300 has been rotated rearward, is changed into the pop-up state from the hidden state, or is changed into the hidden state from the pop-up state, the top surface 320 of the pedal pad 300 and the lower end of the slider 200 are in contact with each other.

When the pedal pad 300 is changed into the pop-up state from the hidden state, the slider 200 is moved up, and when the pedal pad 300 is changed into the hidden state from the pop-up state, the slider 200 is moved down, and in this process, the top surface 320 of the pedal pad 300 and the lower end of the slider 200 keep in contact with each other by the spring force of the return spring 400.

Further, when the pedal pad 300 is in the pop-up state and a driver does not operate the pedal pad 300, the top surface 320 of the pedal pad 300 and lower end of the slider 200 keep in contact with each other. When the driver operates the popped-up pedal pad 300 and the pedal pad 300 is rotated forward, the top surface 320 of the pedal pad 300 and the lower end of the slider 200 are separated.

Figure 6:
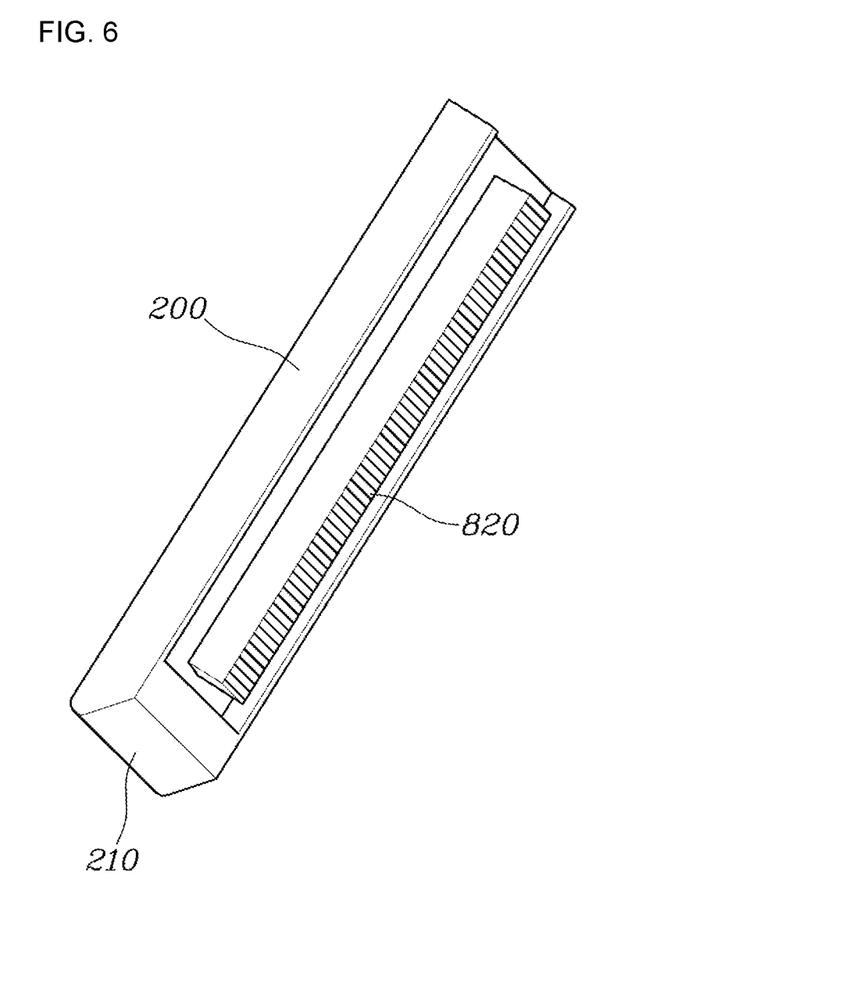
FIG. 6 is a view of the slider according to the present disclosure.

The lower end of the slider 200 is an inclined surface 210 that fits the top surface 320 of the pedal pad 300.

Since the lower end of the slider 200 that comes in contact with the top surface 320 of the pedal pad 300 is an inclined surface 210 inclined forward from the footrest panel 10, when the slider 200 moves down, the inclined surface 210 of the slider 200 easily pushes the top surface 320 of the pedal pad 300, so the pedal pad 300 is smoothly rotated forward on the hinge pin 600.

Further, according to the foldable pedal apparatus of embodiments of the present disclosure, the slider 200 and the top surface 320 of the pedal pad 300 come in contact with each other with an acute angle A2.

Since the angle made by the movement axis of the slider 200 and the top surface 320 of the pedal pad 300 is an acute angle A2 larger than 0° and smaller than 90°, when the slider 200 moves down and the lower end of the slider 200 presses the top surface 320 of the pedal pad 300, the pedal pad 300 is smoothly rotated forward on the hinge pin 600, whereby the pedal pad 300 is smoothly hidden.

The foldable pedal apparatus according to embodiments of the present disclosure further includes a permanent magnet 910 coupled to the pedal pad 300 to face the pedal housing 500, and a Printed Circuit Board (PCB) 920 fixed to the pedal housing 500 to face the permanent magnet 910. The PCB 920 recognizes a variation of magnetic flux of the permanent magnet 910 and generates a signal related to a pedal function when the pedal pad 300 is rotated, and the signal related to a pedal function is a signal related to braking or a signal related to acceleration.

The PCB 920 may have also a function of controlling the operation of the actuator 100. To this end, the PCB 920 and the actuator 100 may be electrically connected to be able to transmit/receive a signal and the actuator 100 is electrically connected with a power device for operation.

FIGS. 2 to 4 show a hidden state in which the pedal pad 300 is positioned in the PE room space and accordingly is not exposed toward a driver.

When the slider 200 is moved down by operation of the actuator 100 and the lower end of the slider 200 presses the top surface 320 of the pedal pad 300, the pedal pad 300 is rotated forward on the hinge pin 600 and inserted into the pedal housing 500, whereby the pedal pad 300 enters the hidden state in which the pedal pad 300 is positioned in the PE room space and cannot be operated by a driver.

When the pedal pad 300 is in the hidden state, a wide space that is not interfered with by a pedal is secured under and ahead of a driver seat, so a driver can take a rest in a comfortable position in a relax mode. Further, misoperation of the pedal during autonomous driving is prevented, so it is possible to improve safety.

FIGS. 8 to 9 show a pop-up state in which the pedal pad 300 has protruded toward an interior to be exposed toward a driver.

When the slider 200 is moved up by operation of the actuator 100 in the hidden state described above, the pedal pad 300 is rotated rearward on the hinge pin 600 by the elasticity of the return spring 400 and is exposed to the interior through the panel hole 11 of the footrest panel 100, whereby the pedal pad 300 is changed into the pop-up state in which the pedal pad 300 can be operated by a driver.

As described above, when the position of the permanent magnet 910 is changed while the slider 200 is moved by operation of the actuator 100 and the pedal pad 300 is rotated into the hidden state or the pop-up state, the PCB 920 does not generate a signal related to a pedal function to prevent misoperation.

Figure 10:
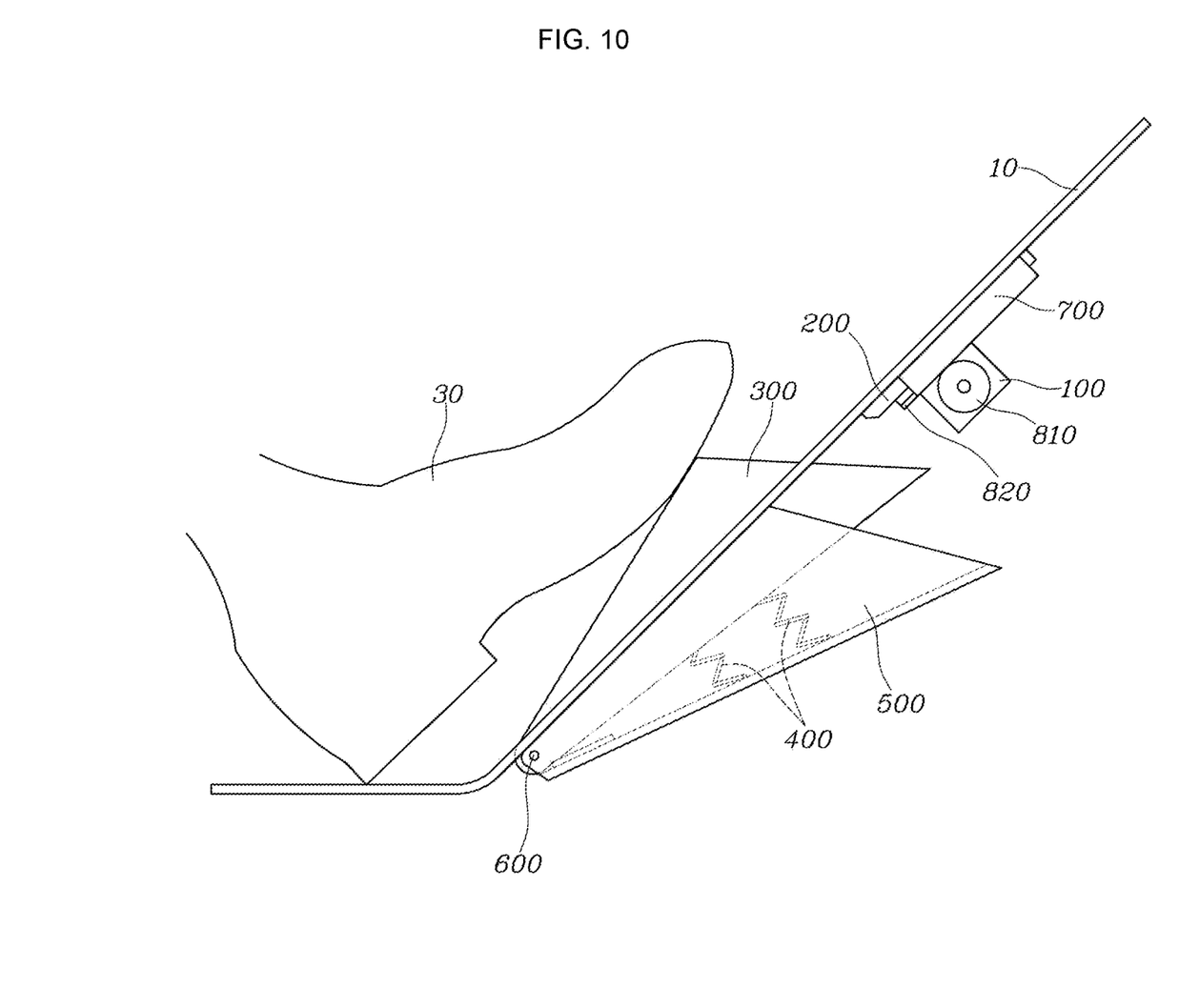
FIG. 10 is a view showing a normal operation state in which a popped-up pedal pad has been rotated by a driver operating the pedal pad.

FIG. 10 shows a normal operation state in which the popped-up pedal pad 300 has been rotated forward by a driver operating the pedal pad 300 with a foot.

As described above, when the pedal pad 300 pops up, a driver normally operating the protruding pedal pad 300 by depressing the pedal pad 300.

When the pedal pad 300 is normally operated, a pedal effort can be achieved by the return spring.

When the pedal pad 300 in the pop-up state is rotated by a driver, the position of the permanent magnet 910 is changed and the PCB 920 recognizes a variation of magnetic flux due to the position change of the permanent magnet 910 and generates a signal related to a pedal function (a signal related to acceleration or a signal related to braking), which can contribute to more stable operation.

Figure 11:
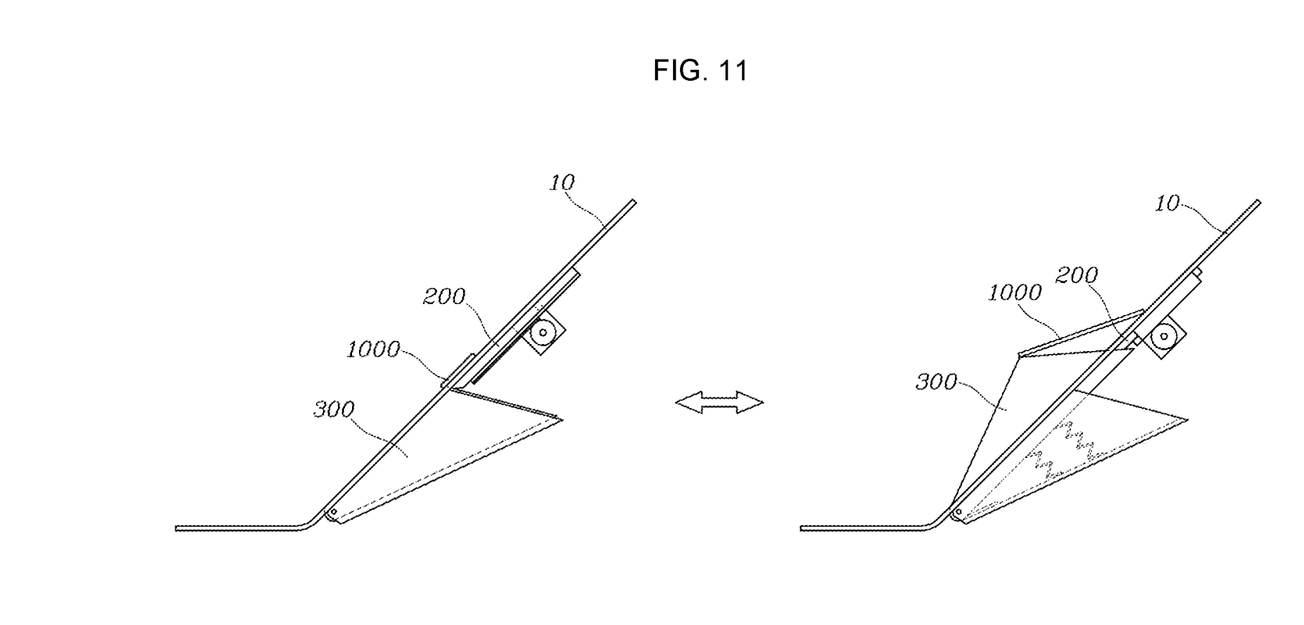
FIG. 11 is a view illustrating a cover member according to the present disclosure.

An exemplary embodiment of the present disclosure further includes a cover member 1000 made of an elastic material and connecting the footrest panel 10 and the pedal pad 300.

The upper end of the cover member 1000 is coupled and fixed to the footrest panel 100 over the panel hole 11 and the lower end of the cover member 1000 is coupled to the pedal pad 300, so it is possible to prevent foreign substances from entering the gap between the slider 200 and the pedal pad 300.

The cover member 900 made of an elastic material is a cover made of a fiber having elasticity such as nylon. Accordingly, the cover member 900 has a characteristic that the external shape thereof is extended by pressure from the pedal pad 300 when the pedal pad 300 is rotated into the pop-up state and is returned when the pedal pad 300 is rotated into the hidden state.

As described above, the foldable pedal apparatus for a vehicle is configured such that the pedal pad 300 protrudes toward a driver to be exposed (pop-up state) such that the pedal pad can be operated by the driver in a manual driving mode in which the driver manually drives, and the pedal pad 300 is hidden not to be exposed to the driver (hidden state) such that the pedal pad cannot be operated by the driver in an autonomous driving situation, whereby there is an advantage that a driver can comfortably take a rest in the autonomous driving situation and it is possible to improve safety by preventing misoperation of pedals in the autonomous driving situation.

Further, there is an advantage that the foldable pedal apparatus can maximally secure a Power Electronic (PE) room space and an interior space and can contribute to reducing the manufacturing cost and the weight by making the mechanism of a foldable pedal as slim and compact as possible.

Although the present disclosure was described with reference to specific embodiments shown in the drawings, it is apparent to those skilled in the art that the present disclosure may be changed and modified in various ways without departing from the scope of the present disclosure which is described in the following claims.

What is claimed is:

1. A foldable pedal apparatus for a vehicle including an autonomous driving mode and a manual driving mode, comprising:

a footrest panel separating a Power Electronics (PE) room space from an interior of a vehicle cabin;

a pedal pad installed to be rotatable with respect to the footrest panel and configured to be operated by a driver; and wherein the pedal pad is rotatable between a hidden state in which the pedal pad is retracted into the PE room space and cannot be operated by the driver during the autonomous driving mode and a pop-up state in which the pedal pad is extended into the interior of the vehicle cabin and can be operated by the driver during the manual driving mode;

a slider configured to move linearly with respect to the footrest panel by power of an actuator to rotate the pedal pad between the hidden and pop-up states;

a guide configured to guide movement of the slider, wherein the guide extends from the footrest panel in a direction towards the front of the vehicle;

a return spring configured to provide elasticity to the pedal pad.

2. The foldable pedal apparatus of claim 1, wherein the actuator, the slider, the pedal pad, and the return spring comprise a first pedal assembly and the foldable pedal apparatus comprises a second pedal assembly, the second pedal assembly comprising a second actuator, a second slider, a second pedal pad, and a second return spring, the first and second pedal assemblies are spaced apart from each other.

3. The foldable pedal apparatus of claim 2, wherein one of the two pedal assemblies is used as an accelerator pedal apparatus and the other one is used as a brake pedal apparatus.

4. The foldable pedal apparatus of claim 1, further comprising a pedal housing that is fixed at a front side of the footrest panel and to which a lower end of the pedal pad is rotatably coupled through a hinge pin, wherein the pedal pad is rotated forward on the hinge pin and inserted into the pedal housing in the autonomous driving mode, and wherein the pedal pad is rotated rearward on the hinge pin and protrudes into the interior of the vehicle cabin through a panel hole of the footrest panel in the manual driving mode.

5. The foldable pedal apparatus of claim 4, wherein when the pedal pad is rotated forward on the hinge pin and inserted into the pedal housing in order to enter the hidden state a pad surface of the pedal pad is leveled with the footrest panel such that the driver cannot operate the pedal pad.

6. The foldable pedal apparatus of claim 4, further comprising:

a permanent magnet coupled to the pedal pad to face the pedal housing; and a printed circuit board (PCB) coupled to the pedal housing to face the permanent magnet, wherein the PCB recognizes a variation of magnetic flux of the permanent magnet and generates a signal related to a pedal function when the pedal pad is pressed by the driver.

7. The foldable pedal apparatus of claim 6, wherein when the slider is moved by operation of the actuator and a position of the permanent magnet is changed while the pedal pad is rotated into the hidden state or the pop-up state, the PCB does not generate a signal related to the pedal function to prevent misoperation.

8. The foldable pedal apparatus of claim 6, wherein the PCB generates a signal related to the pedal function only when the pedal pad is moved forward by pressing of the driver and the position of the permanent magnet is changed without the actuator operating in the pop-up state in which the slider has been moved by operation of the actuator and the pedal pad has been rotated by elasticity of the return spring to be exposed toward the driver.

9. The foldable pedal apparatus of claim 1, wherein a panel hole through which the pedal pad is disposed is formed at the footrest panel; and wherein the guide is disposed above the panel hole.

10. The foldable pedal apparatus of claim 1, wherein the actuator is a rotary motor fixed to the footrest panel and being able to rotate both clockwise and counterclockwise; and wherein a pinion is coupled to the rotary motor and a rack gear is coupled to the slider, so power of the rotary motor is transmitted to the slider through the pinion and the rack gear.

11. A vehicle comprising the pedal apparatus system of claim 1.

12. A foldable pedal apparatus for a vehicle including an autonomous driving mode and a manual driving mode, comprising:

a footrest panel separating a Power Electronics (PE) room space from an interior of a vehicle cabin;

a pedal pad installed to be rotatable with respect to the footrest panel and configured to be operated by a driver, the pedal pad including a pad surface and a topmost surface; and wherein the pedal pad is rotatable between a hidden state in which the pedal pad is retracted into the PE room space and cannot be operated by the driver during the autonomous driving mode and a pop-up state in which the pedal pad is extended into the interior of the vehicle cabin and can be operated by the driver during the manual driving mode;

a slider configured to move linearly with respect to the footrest panel by power of an actuator, the slider contacting the topmost surface of the pedal pad to transition the pedal pad from the pop-up state to the hidden state;

a return spring configured to provide elasticity to the pedal pad.

13. The foldable pedal apparatus of claim 12, wherein in both the hidden and pop-up states, the return spring biases the topmost surface of the pedal pad into contact with the slider.

14. The foldable pedal apparatus of claim 13, wherein when the pedal pad is in the pop-up state, the driver operating and pressing the pedal pad causes the topmost surface of the pedal pad to separate from the slider.

15. The foldable pedal apparatus of claim 12, wherein the slider comprises a lower end that is an inclined surface that engages with the topmost surface of the pedal pad.

16. The foldable pedal apparatus of claim 12, wherein the topmost surface of the pedal pad is connected to the pad surface with an obtuse angle.

17. A foldable pedal apparatus for a vehicle including an autonomous driving mode and a manual driving mode, comprising:

a footrest panel separating a Power Electronics (PE) room space from an interior of a vehicle cabin;

a pedal pad installed to be rotatable with respect to the footrest panel and configured to be operated by a driver; and wherein the pedal pad is rotatable between a hidden state in which the pedal pad is retracted into the PE room space and cannot be operated by the driver during the autonomous driving mode and a pop-up state in which the pedal pad is extended into the interior of the vehicle cabin and can be operated by the driver during the manual driving mode;

a slider configured to move linearly with respect to the footrest panel by power of an actuator to rotate the pedal pad between the hidden and pop-up states;

a return spring configured to provide elasticity to the pedal pad;

a cover member made of an elastic material, wherein the cover member is extended and contracted when the pedal pad is rotated, thereby preventing foreign substances from entering a gap between the slider and the pedal pad.

\* \* \* \* \*